United States Patent
Bender

(10) Patent No.: US 10,432,541 B2
(45) Date of Patent: Oct. 1, 2019

(54) SOURCE PRIORITIZED USEFUL SUB-PAYLOAD COMPUTER DATA TRANSMISSIONS

(71) Applicant: Microsoft Technology Licensing, LLC, Redmond, WA (US)

(72) Inventor: Beau Bender, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/370,965

(22) Filed: Dec. 6, 2016

(65) Prior Publication Data

US 2018/0159951 A1    Jun. 7, 2018

(51) Int. Cl.
G06F 15/167 (2006.01)
H04L 12/851 (2013.01)
H04L 29/08 (2006.01)

(52) U.S. Cl.
CPC .......... *H04L 47/2433* (2013.01); *H04L 67/02* (2013.01)

(58) Field of Classification Search
CPC ......... H04L 47/70; H04L 67/10; H04L 47/26; H04L 41/5032; H04L 41/5038; H04L 43/04; H04L 67/1008; H04L 67/16; H04L 67/2857
See application file for complete search history.

(56) References Cited

U.S. PATENT DOCUMENTS

| | | |
|---|---|---|
| 6,314,087 B1 | 11/2001 | Oh |
| 6,917,606 B2 | 7/2005 | Sashihara |
| 6,967,920 B2 | 11/2005 | Seidl et al. |
| 7,277,419 B2 | 10/2007 | McGowan |
| 8,442,955 B2 | 5/2013 | Al Kiswany et al. |
| 8,583,977 B2 | 11/2013 | Munson et al. |
| 8,862,680 B2 | 10/2014 | Van Wyck Gould et al. |

(Continued)

FOREIGN PATENT DOCUMENTS

CN    103455459 A    12/2013

OTHER PUBLICATIONS

Sahu, Subhankar, "Large Payload Handling in SOA", Published on: May 20, 2014 Available at: http://myexperienceswithsoa.blogspot.in/2014/05/large-payload-handling-in-soa.html.

*Primary Examiner* — Suraj M Joshi
*Assistant Examiner* — Ayele F Woldemariam
(74) *Attorney, Agent, or Firm* — Goff IP Law PLLC; Jared Goff

(57) ABSTRACT

A request to transmit an overall payload from a source computer system to a destination computer system can be received. A plurality of sub-payloads in the overall payload can be defined. Each sub-payload can be a computer-usable payload that includes feedback data regarding an experience in the source computer system and can be configured to be used without one or more other sub-payloads in the overall payload. The sub-payloads can be prioritized relative to each other to produce a computer-readable sub-payload priority order. The prioritizing can use rules that dictate different priorities for different sets of data in the sub-payloads. Sub-payload(s) can be transmitted from the source computer system to the destination computer system separately from each other in the sub-payload priority order. Also, data associating the one or more transmitted sub-payloads with the overall payload can be transmitted to the destination computer system.

20 Claims, 4 Drawing Sheets

(56) References Cited

U.S. PATENT DOCUMENTS

| | | | |
|---|---|---|---|
| 8,909,261 B1* | 12/2014 | Upadhyay et al. | H04L 47/12 455/466 |
| 9,201,824 B2 | 12/2015 | Gjoerup | |
| 9,336,268 B1* | 5/2016 | Moudy et al. | G06F 17/27 |
| 2004/0042440 A1* | 3/2004 | McGowan | H04J 3/04 370/345 |
| 2009/0113145 A1* | 4/2009 | Slater et al. | G06F 13/00 711/154 |
| 2010/0085912 A1* | 4/2010 | Chun | H04L 1/0026 370/328 |
| 2010/0135173 A1* | 6/2010 | Tynderfeldt et al. | H04W 36/00 370/252 |
| 2012/0084392 A1 | 4/2012 | Lipfert et al. | |
| 2015/0312127 A1* | 10/2015 | Leeme et al. | H04L 43/0894 |

* cited by examiner

SOURCE PRIORITIZED USEFUL SUB-PAYLOAD COMPUTER DATA TRANSMISSIONS

BACKGROUND

In transmitting data from a source computer system to a destination computer system, sometimes the overall payload including the data is divided or chunked by the number of bytes in the "chunks." For example, a user input may request that feedback data be sent from a client computer to a server computer. The feedback data may include 500 kilobytes of feedback data regarding an experience in the client computer. As an example, this content would potentially be broken into five 100 kilobyte chunks, which are sent sequentially to the server.

SUMMARY

The tools and techniques discussed herein relate to source prioritized useful sub-payload computer data transmissions. In such transmissions, multiple sub-payloads from an overall payload are prioritized in a transmission priority order via a source computer system. Each sub-payload includes data, such as feedback data regarding an experience in the source computer system and/or other data, that is configured to be used without the other sub-payloads in the overall payload, but the sub-payloads can be associated with the overall payload in transmission to facilitate combining the sub-payloads at destination computer system following the transmission.

In one aspect, the tools and techniques can include receiving a computer-readable request at the source computer system to transmit an overall payload from the source computer system to a remote destination computer system. The technique can further include defining a plurality of sub-payloads in the overall payload. Each of the defined sub-payloads can be a computer-usable payload that includes data, such as feedback data regarding the experience and/or other data, and is configured to be used without one or more other sub-payloads in the overall payload. Additionally, the technique can include prioritizing the sub-payloads relative to each other to produce a computer-readable sub-payload priority order of transmitting the sub-payloads from the source computer system to the destination computer system. The prioritizing can use a set of computer-readable rules that dictate different priorities for different sets of data in the sub-payloads. The technique can also include transmitting one or more of the sub-payloads from the source computer system to the destination computer system separately from each other in the sub-payload priority order. Also the technique can include transmitting to the destination computer system data associating the one or more transmitted sub-payloads with the overall payload.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
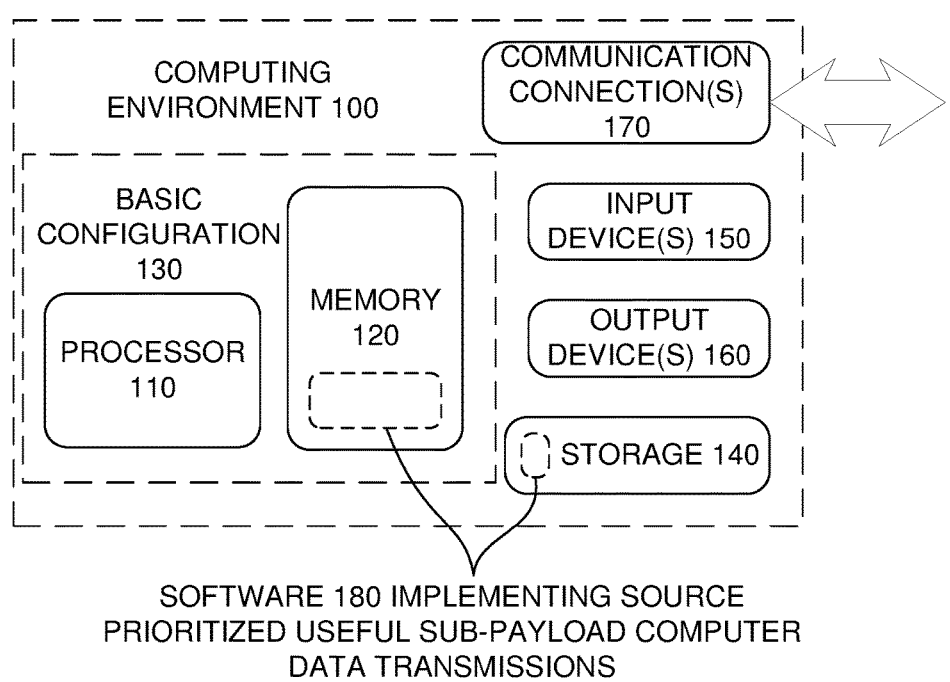
FIG. 1 is a block diagram of a suitable computing environment in which one or more of the described aspects may be implemented.

Aspects described herein are directed to techniques and tools for improved data transmissions of computer data, such as feedback data from a source computer system. As used herein, feedback data is data that is configured to provide information about an experience (i.e., a set of one or more occurrences or events) in a computer system. The feedback data may be configured for use in improving or modifying the computer system in response to the feedback, so that future instances of similar experiences are also improved. The tools and techniques may also be used to improve transmissions of other types of data. Such improvements in data transmissions may result from the use of various techniques and tools separately or in combination.

Such techniques and tools may include atomizing (breaking into sub-payloads that can each be used without other sub-payloads that are sent later) and prioritizing large data payloads, which can provide for sending the smallest and/or highest value sub-payload first and sequentially enriching it with lower priority and/or potentially larger sub-payloads. This transmission-time prioritization of sub-payloads (following a request to make the transmission) can enable developers to dictate in rules that more critical sub-payloads are to be sent earlier. This can be followed by ongoing enrichment of data through additional transmissions of lower priority sub-payloads.

As compared to previous techniques where payloads such as feedback data were split into even-size chunks to be transmitted, and where the chunks were only useful if all the chunks were received, the tools and techniques discussed herein can increase the odds of successfully transmitting the data deemed by the rules to be the highest priority, in a useable form. This can occur even if the transmission fails before all the data in the overall payload is transmitted. Thus, the tools and techniques here can increase the odds of successfully receiving at least some useful portion of an ordinarily large payload because it reduces the likelihood of timeouts, disruptions due to intermittent connectivity, and other issues interrupting the highest priority sub-payloads. These tools and techniques can also allow developers to define their sub-payloads in terms other than by size in kilobytes, such as by time spent in transmission (e.g., by timing out if transmissions take too long for some payloads), which can balance the customer experience against the developers' needs. The tools and techniques discussed herein can still allow for transmitting the overall payload in a similar amount of time to prior techniques where the data was split and sent in same-size chunks.

Accordingly, the tools and techniques discussed herein can increase the effectiveness of transmitting payloads, such as payloads that include feedback data from an experience in a source computer system that is sending the payloads (where the experience includes a set of one or more events in the client computer system and/or one or more states of the client computer system). For example, the experience may be a user interface experience (such as an experience involving user input and/or output on user interface devices, which may include user input devices and/or user output devices in a source computer device or source computer system). The feedback data can include contextual data (e.g., log data, telemetry data, or screen shots of displays regarding the experience that is the subject of the feedback data), and may also include user input feedback data regarding the user interface experience.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a source computer system or a destination computer system. Generally, various different computing system configurations can be used. Examples of well-known computing system configurations that may be suitable for use with the tools and techniques described herein include, but are not limited to, server farms and server clusters, personal computers, server computers, smart phones, Internet of Things (IoT) devices, smart watches, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing source-prioritized useful sub-payload computer data transmissions. An implementation of source-prioritized useful sub-payload computer data transmissions may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Payload Transmission System

Figure 2:
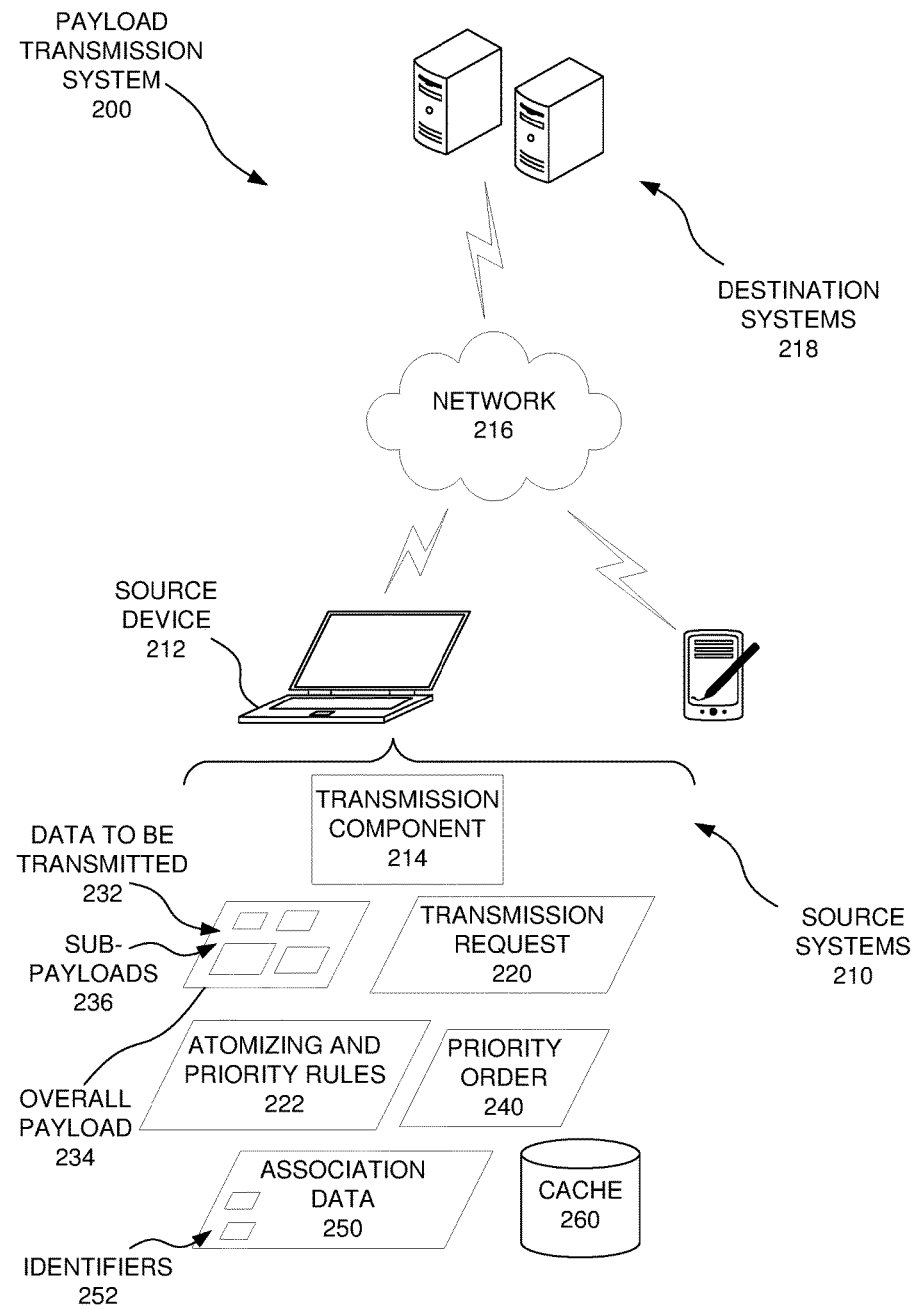
FIG. 2 is a schematic diagram of a payload transmission system.

FIG. 2 is a schematic diagram of a payload transmission system (200) in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent or transmitted to a destination by a component if that component passes the communication or data item to the system in a manner that directs the system to route the item or communication to the destination, such as by including an appropriate identifier or address associated with the destination. Also, a data item may be sent or transmitted in multiple ways, such as by directly sending the item or by sending a notification that includes an address or pointer for use by the receiver to access the data item. In addition, multiple requests may be sent or transmitted by sending a single request that requests performance of multiple tasks.

A. Transmission System Components

Referring now to FIG. 2, components of the payload transmission system (200) will be discussed. Each of the components includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

The payload transmission system (200) can include source computer systems (210), which can each include a single source computer device (212) or multiple source computer devices (212) working in cooperation. A source computer system (210) can include a transmission component (214), which can receive and respond to a transmission request (220), such as a user input request or an automated transmission request (such as a request that operates on a schedule). The transmission component (214) can be configured to transmit and receive data through a computer network (216), such as to and from a destination computer system (218). For example, the transmission component (214) may include one or more computer software applications and/or operating system components as well as underlying hardware components hosting and carrying out instructions from such software components. Examples of such software applications can include Web browsers, digital assistant applications, or other specific-use software applications. Operating system components that are part of the transmission component (214) may include operating system components that are interacting with the software applications to run such applications and/or carry out transmissions to and/or from such applications and other components inside and outside the source computer system (210).

The transmission component (214) can generate, access, and use computerized data items in its source system (210). For example, the transmission component can use computer-readable atomizing and priority rules (222). Such rules (222) can be in any of various different forms. For example, the rules (222) can be in the form of object code or computer-executable scripts (such as in the JavaScript® programming language) that can be accessed and executed by the transmission component (214). The rules (222) may be included in the same code as at least part of the code for the transmission component (214). The transmission component (214) can also access data (232) that is to be transmitted. For example, the data (232) may include feedback data that provides information about an experience in the source computer system (210), such as an experience with a particular software and/or hardware component in the source computer system (210). The transmission component (214) can package the data (232) into an overall payload to be transmitted to a destination system (218), as instructed by the rules (222). The rules (222) can be followed by the transmission component (214) to atomize the data to be transmitted into sub-payloads (236) in the data (232) that can be used without one or more other sub-payloads in the data (232). This atomizing can include identifying the sub-payloads (236) in the data (232) and formatting the sub-payloads (236) so that they are useable by the destination computer system (218) to which they will be sent, without needing one or more other sub-payloads (236) in the overall payload (234), such as payloads that are transmitted later.

The sub-payloads (236) can be prioritized by the transmission component (214), applying the rules (222), to produce a computer-readable priority order (240). The transmission component (214) can follow that priority order (240) in transmitting the sub-payloads (236) to the destination computer system (218). The rules (222) can be separate from the data in the overall payload (234), such as where the rules are included in code for an application running in the source computer system (210). The rules may be downloaded from the destination system (218) to the source computer system (210), such as where the rules are transmitted along with the content of a Web page that is downloaded from the destination computer system (218) to the source computer system (210). The transmission component (214) can also generate and transmit association data (250) to the destination system (218), which the destination system (218) can use to associate the sub-payloads (236) with the overall payload (234), such as by associating the sub-payloads (236) for an overall payload (234) with each other as those sub-payloads (236) are received at the destination system (218) (such as by including all the sub-payloads (236) in a container).

Each source system (210) can also include a cache (260), which can be storage in the source system (210) in which sub-payloads (236) that failed to transmit successfully to the destination system (218) in response to the transmission request (220) can be stored, so that transmission of such failed sub-payloads (236) can be attempted again at a later time.

B. Source Prioritized Useful Sub-Payload Transmission Example

Figure 3:
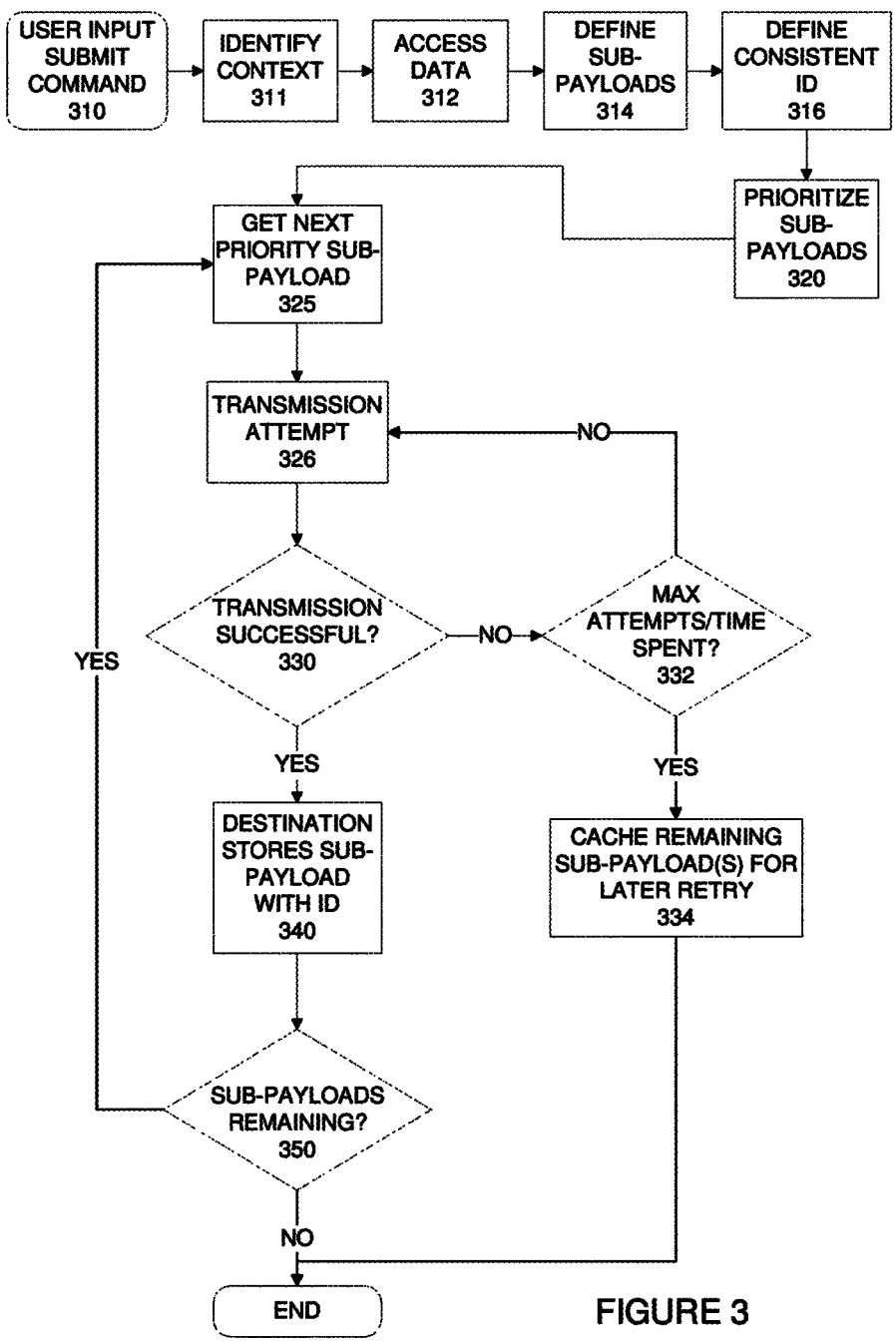
FIG. 3 is a flowchart of an example of a source prioritized useful sub-payload computer data transmission technique.

Referring to FIG. 3 and still referring to FIG. 2, an example of a technique for source prioritized useful sub-payload transmission will be discussed. This technique may be performed via a source computer system (210), and specifically may be performed via a transmission component (214) of the source computer system (210), except for acts that are specifically identified as being performed by other computer components outside the source computer system (210) (such as by the destination computer system (218)).

The technique of FIG. 3 can begin with a user input submit command (310). As an example, user input may have been provided via a control on a user interface display, asking to submit feedback. The source computer system (210) may respond to such input by displaying a feedback dialog display that allows the user to input data, such as giving a rating to a computer product being used (e.g., to a software product), and allowing the user to enter text into a text box. Such a dialog may also include a submit control that can be selected by user input to send the user input submit command (310) to the transmission component (214), such as via an application programming interface call or an internal call within an application running in the source computer system (210). In some implementations, a different command may operate as a request to transmit the overall payload (234), such as a command generated according to an automated schedule for transmitting data, such as feedback data.

In response to the user input submit command (310), the transmission component (214) can identify (311) the context in which it is operating. The operations that follow may be different depending on the context. For example, a software variable may be set to identify the application in which the transmission component (214) is operating. As such, different instances of the same code for the transmission component may be used in different applications, or on different types of source computer systems (210). In one example, the code may operate as a Web property for a Website that is being accessed via a Web browser on a client machine, or in one or more specific applications installed and running on the client machine. Each of these may have different types of data (232) that is to be transmitted to the destination system (218), and may even be transmitting to different destination endpoints (e.g., different destinations designated by different uniform resource locators or addresses, for example) and/or different destination computer systems (218). Accordingly, the transmission component (214) may use different sets of atomizing and priority rules (222) for different contexts, such as one set of rules (222) when it is operating via a Web browser for Website, and another set of rules when it is operating for a standalone separate application in an operating system environment without involving a Web browser. For example, such different selections of rules may involve the source computer system (210) following a different code path when executing computer code that includes multiple sets of the atomizing and priority rules (222).

The transmission component (214) can access (312) data such as feedback data, which in this example is the data (232) to be transmitted (thus feedback data is designated with the reference number for data (232) to be transmitted in this example). However, the tools and techniques discussed herein may be useful for other types of data (232), besides feedback data, so long as that data (232) is to be transmitted in useful sub-payloads (236) of an overall payload (234) from a source computer system (210) to a destination computer system (218). For example, other types of data may include data such as social media posts or other messaging data, which may include multiple sub-payloads that can each be useful without other sub-payloads. The accessing (312) of the feedback data (232) can include generating at least some of the data (232). For example, this may include generating screenshot images of what was displayed by the source computer system (210) prior to the indication that feedback was to be provided, with such images to be included in the feedback data (232).

The transmission component (214) may also define (314) sub-payloads (236) that include portions of the data (232) to be transmitted, and include the sub-payloads (236) in the overall payload (234). For example, the overall payload (234) and the sub-payloads (236) may be in the form of JavaScript® Object Notation (JSON) objects. Defining (314) the sub-payloads (236) can include applying the selected set of atomizing and priority rules (222) to select different sets of data to be included in different sub-payloads (236). The definition of the sub-payloads (236) may also include reformatting at least some of the data (232), such as reformatted to optimize the data (232) for transmission, or for use by a destination computer system (218) without needing one or more of the other sub-payloads (236) in the overall payload (234). The defining (314) can include selecting different parts of the data (232) that can be used without needing other parts of the data (232), and including such stand-alone units of data as sub-payloads (236). For example, if the HTML code for a Web page viewed prior to the user input submit command (310) is to be included as a sub-payload (236), then images that are included in the Web page locally in a Web browser may be removed, but links to those images on the Website may be preserved in the HTML code that is included in the sub-payload (236).

The transmission component (214) may also define (316) a consistent identifier (252) that can be included in each sub-payload (236). Such identifiers (252) can be the association data (250), which the destination system (218) can use to associate the sub-payloads (236) with each other and thus with the overall payload (234). Alternative techniques may be used for the association data (250). For example, each sub-payload (236) may include its own unique identifier, which is generated by the transmission component (214) (such as by generating anew according to a routine or selecting from a pre-defined list of identifiers). The first sub-payload (236) sent to the destination system (218) can include a list of all such identifiers, allowing the destination system (218) to associate the sub-payloads to each other and to the overall payload (234) by matching an identifier in the list with an identifier found in a subsequent sub-payload (236). As another example, the association data (250) may not be included in the sub-payloads. For example, the transmission component (214) may process each sub-payload (236) to generate a unique number from that identifies the sub-payload (236), such as by using a hashing function. The transmission component (214) may then send a list of such identifiers (such as hash values) for an overall payload (234) to the destination system (218) prior to sending the corresponding sub-payloads (236). The destination system (218) can perform the same process on each received sub-payload (236), and can compare the resulting values with values in previously-received lists to match each sub-payload with a list, and therefore with an overall payload (234) and other sub-payloads (236) in the overall payload (234). The defining (316) of the consistent identifiers (252) can include preparing the identifiers to be sent to the destination system (218), such as by including the same consistent identifier (252) in each of the sub-payloads (236) for an overall payload (234).

The transmission component (214) can also prioritize (320) the sub-payloads (236). This can include accessing and applying the rules (222). For example, a set of the rules (222) may dictate which types of data are to be included as sub-payloads (236) in a particular context, and the rules may also include a set priority order (240) in which those types of data are to be transmitted.

For example, for providing feedback for a Website, the rules (222) may dictate that user-entered feedback text and an indication of the user's sentiment (such as a sentiment ranking provided by user input) may be included in a highest priority sub-payload (236) to be transmitted first. The rules (222) may also dictate that the code for the Web page that was displayed prior to the feedback being provided (such as HTML code) is included in a second highest priority sub-payload (236), to be transmitted second. The rules (222) may dictate that a third sub-payload (236) with a third highest priority that is transmitted third includes code for the Web page that was displayed prior to the feedback being provided, along with data depicting user input highlighting of particularly relevant areas of the Web page for the feedback. The rules (222) may dictate that a fourth sub-payload (236) with a fourth highest priority that is transmitted fourth can include debugging data such as trace log files from a Web browser application.

As another example, for providing feedback for an audible messaging bot application that runs in an operating system environment, the rules (222) may dictate that user-entered feedback text and an indication of the user's sentiment (such as a sentiment ranking provided by user input) may be included in a highest priority sub-payload (236) to be transmitted first. The rules (222) may also dictate that a screenshot of what was being displayed prior to the feedback being provided (such as an image file for the screenshot) is included in a second highest priority sub-payload (236), to be transmitted second. The rules (222) may dictate that a third sub-payload (236) with a third highest priority that is transmitted third can include debugging data such as trace log files from a Web browser application. Finally, the rules (222) may dictate that a fourth sub-payload (236) with a fourth highest priority that is transmitted fourth can include sound files of what was recorded from the user's statements during a conversation with the messaging bot, as well as text and/or sound files of the messaging bot's statements made during the conversation.

It is possible that some of the data in the sub-payloads (236) may include personal information. Measures can be taken to protect user's privacy interests in such data. For example, the data may be secured using encryption and/or other data security techniques during storage, transmission and use of the data. Also, the payload transmission system (200) may provide notifications to users of how their data is handled, and may allow users to opt into or out of the collection, transmission, and/or use of particular types of data.

The rules (222) may dictate a particular order that is always followed for a particular application, or a particular Web page. Alternatively, additional decision-making techniques may be included in the rules (222). For example, if the transmission component (214) detects that user input in a feedback dialog indicates that an audio messaging bot did not appear to hear the user's statement, then the rules (222) may dictate that audio files of recorded audio from the source computer system's microphone will be in a higher priority sub-payload (236) than a screenshot of a display, even though the opposite priority would be used otherwise. As an example, the transmission component (214) may determine this from user input to pre-set selections (e.g., a selection in a drop-down menu asking for the user's general type of feedback) and/or searching for keywords in user-entered text in a text box of a feedback dialog. Indeed, the transmission component (214) may submit the user-entered text to a language understanding component for categorization, which can be used in selecting one of several alternative priority rule scenarios (e.g., where audio files are a higher priority in one rule set and screenshots are a higher priority in a different rule set). The rules (222) may define a ranking process that weighs multiple factors to rank the sub-payloads (236) that are available in a particular context. For example, such factors may include the sub-payload size, an importance weighting factor for each of multiple different types of data (232) that are available in different sub-payloads, the presence of different contextual scenarios (e.g., whether the user included some form of the word "hear" in the text box, etc.), and/or other factors. Additionally, the weights for such factors may be trained using training data and results from user input of developers indicating which results are more useful in different situations, to refine the weights prior to their widespread use. The rules (222) may subsequently be adjusted over time if they incorporate such ranking techniques, such as in a machine learning technique that considers which types of information were ranked as higher priorities and which were ultimately determined to be most useful from a troubleshooting developers' user input and/or other indications of usefulness (e.g., number of times the information is accessed by troubleshooters in the destination system (218), amount of time troubleshooters spent viewing the information in the destination system (218), etc.). Such machine learning techniques can be similar to machine learning techniques used in refining search engine factor weighting algorithms.

With whatever technique is used for prioritizing (320), that prioritizing can produce a computer-readable priority order (240) of the sub-payloads (236), which includes one or more computer-readable indications of the order in which the sub-payloads are to be transmitted to the destination system (218). The priority order (240) may be implemented in different ways, such as indications within the sub-payloads themselves, an order in which the sub-payloads are included in a queue, references to the sub-payloads in a separate priority order data structure, etc.

The sub-payloads (236) may be sent serially relative to each other in order of priority, where a second priority sub-payload (236) does not begin transmitting until after first priority sub-payload (236) has been successfully transmitted. However, the transmitting of the sub-payloads (236) may be performed in parallel (asynchronously) with other operations in the source computer system (210), so that other operations outside the transmission are not blocked during the transmission.

With the sub-payloads (236) having been prioritized (320), the transmission component (214) can begin the process of transmitting the sub-payloads in the order of their priority. This can include using the priority order (240) to identify and get (325) the next priority sub-payload (236). To begin, this can be the highest priority sub-payload (236), followed by the next highest priority, and so forth. If sub-payloads (236) had previously been cached after a prior unsuccessful attempt to transmit those sub-payloads (236), then such sub-payloads may be transmitted before sub-payloads (236) in the new overall payload (234). Alternatively, prioritization may be performed between different sub-payloads (236) in the new overall payload (234) and the sub-payloads (236) in the older overall payload (234) that failed to completely transmit in a previous attempt. For example, the highest priority sub-payload (236) from the new overall payload (234) may be transmitted first if at least the highest priority sub-payload (236) from the old overall payload (234) was already successfully transmitted.

In any event, the sub-payload (236) determined to be the highest priority is then attempted (326) to be transmitted. For example, this may be done by posting the sub-payload (236) using an asynchronous XMLHttpRequest, or another similar request in a different protocol. If it is determined that the transmission attempt (326) was not successful (such as if it times out before successfully transmitting), then it is determined (332) whether a maximum for attempting (326) the transmission of that sub-payload (236) and/or for the overall transmission has been reached, such as a number of attempts for the sub-payload (236) and/or an overall amount of time for the sub-payload (236) and/or for the overall payload (234). For example, a maximum of three attempts (326) for each sub-payload (236) may be allowed.

If it is determined (332) that the maximum has not been reached, then the transmission of that sub-payload (236) can be attempted (326) again. If it is determined (332) that the maximum has been reached, the remaining sub-payload(s) (236) that have not been successfully transmitted can optionally be cached (334) in the source computer system's cache (260), so that transmission of those sub-payload(s) (236) can be attempted (326) again at a later time, such as after a subsequent user input submit command (310) requesting transmission of a subsequent overall payload (234). The sub-payloads (236) can remain in the cache (260) until an event triggers their removal from the cache (260). For example, sub-payloads (236) may be removed from the cache (260) if they have been in the cache (260) for longer than a predetermined expiration time period (e.g., longer than 90 days). As another example, sub-payloads (236) may be removed from the cache (260) if the cache has reached its space limit, and a new item is to be included in the cache storage. The cache (260) may also include other items besides the sub-payloads (236). For example, the cache (260) may be a browser storage cache (such as an HTML5 storage cache).

If it is determined (330) that the transmission attempt (326) was successful, then the transmitted sub-payload (236) can be stored (340) with its identifier (252) in the destination computer system (218). This can include the destination computer system (218) searching for previously received sub-payloads (236) with matching identifiers (252), so that matching sub-payloads (236) with such matching identifiers (252) can be associated with each other in the destination computer system (218). The searching may be performed in any of various different ways for searching stored data, such as standard database search methods. Matching sub-payloads (236) can be included together in a payload container. Such a payload container need not be all in a continuous physical storage location. For example, a payload container may be implemented using a computer-readable database index that links storage locations for sub-payloads (236) together so that those sub-payloads (236) can be accessed and used as a single overall payload (234). Thus, as additional sub-payloads (236) are received, the destination computer-system (218) can combine together different sub-payloads (236) to provide the single overall payload (234) with more complete information, such as more complete feedback information on an experience in the source computer system to which all the sub-payloads (236) in an overall payload (234) relate. Accordingly, the successfully received sub-payloads (236) can be combined and used together via the destination computer system (218).

After determining (330) that the transmission attempt (326) of a sub-payload was successful, the transmission component (214) of the source computer system (210) can determine (350) whether there are remaining sub-payloads (236) in the source computer system (210) that have not yet been successfully transmitted. If so, the process can proceed back to getting (325) the next highest priority sub-payload (236), attempting (326) its transmission, determining (330) whether the attempt (326) was successful, and so forth, as with the previous sub-payload. The overall transmission process can end after caching (334) the remaining sub-payloads (236) as discussed above, or determining (350) that no more sub-payloads (236) remain to be transmitted.

While particular examples of the transmission process are discussed here with reference to FIG. 3, different details in the process may be used. For example, rather than caching (334) remaining sub-payloads (236) in response to determining (332) that the maximum has been reached, the remaining sub-payloads (236) may be discarded. For example, this may be done in a context where it is determined that such cached sub-payloads (236) would not be useful in the destination computer system (218) at a later time, or where storage space is very limited.

III. Source Prioritized Useful Sub-Payload Computer Data Transmission Techniques Several source prioritized useful sub-payload computer data transmission techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 4:
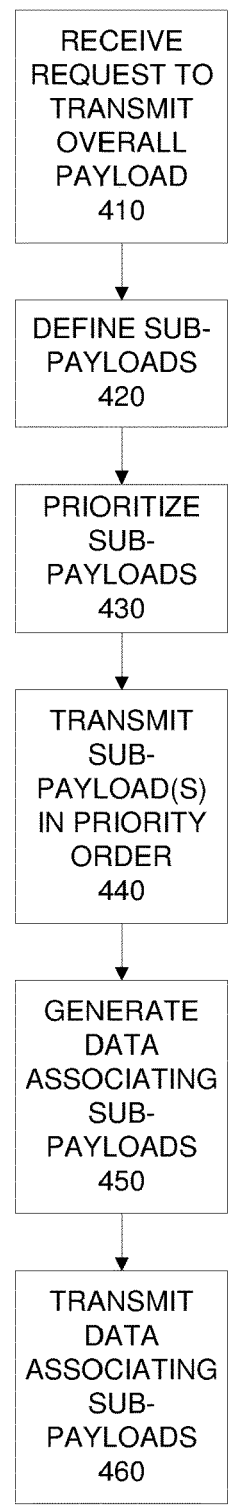
FIG. 4 is a flowchart of another example of a source prioritized useful sub-payload computer data transmission technique.

Referring to FIG. 4, a source prioritized useful sub-payload computer data transmission technique will be described. The technique can include receiving (410) a computer-readable request at the source computer system to transmit an overall payload from the source computer system to a remote destination computer system. One or more of the other acts of the technique of FIG. 4 discussed below can be performed via the source computer system in response to the receiving (410) of the request, and the source computer system may include one or more computer devices. The overall payload can include data such as feedback data (though the payload may include other types of data instead of, or in addition to, feedback data, as discussed above) providing information about an experience in the source computer system. The technique can further include defining (420) a plurality of sub-payloads in the overall payload. Each of the defined sub-payloads can be a computer-usable payload that includes feedback data regarding the experience and is configured to be used without one or more other sub-payloads in the overall payload. Additionally, the technique can include prioritizing the sub-payloads relative to each other to produce a computer-readable sub-payload priority order of transmitting the sub-payloads from the source computer system to the destination computer system. The prioritizing (430) can use a set of computer-readable rules that dictate different priorities for different sets of data in the sub-payloads. The technique can also include transmitting (440) one or more of the sub-payloads from the source computer system to the destination computer system separately from each other in the sub-payload priority order. Also the technique can include generating (450) data associating the one or more transmitted sub-payloads with the overall payload, and transmitting (460) that associating data to the destination computer system. The features of the following paragraphs may be used in combination with features discussed in this paragraph and/or with one or more of the features of the example technique discussed above with reference to FIG. 3. Also, one or more features discussed above with reference to FIG. 3 may be used in combination with one or more features of the technique of FIG. 4 discussed here.

The one or more sub-payloads can include multiple sub-payloads that are each different sizes, and the rules can favor sending smaller sub-payloads earlier than larger sub-payloads. Also, different sub-payloads may include different types of data and the rules may favor sending sub-payloads with some types of data before sub-payloads with other types of data.

The generating (450) of the data associating the one or more transmitted payloads with the overall payload can include producing one or more identifiers, including an identifier for each of the one or more sub-payloads, with each identifier of the one or more identifiers being configured to associate a corresponding sub-payload with the overall payload. Also, the transmitting (460) of the data associating the one or more transmitted payloads with the overall payload can include transmitting the one or more identifiers to the destination computer system. The technique of FIG. 4 may further comprise including each identifier of the one or more identifiers in its corresponding sub-payload, and the transmitting (460) of the one or more identifiers can include transmitting each identifier of the one or more identifiers as part of its corresponding sub-payload. The identifier(s) may include multiple identifiers that are each the same as each other, such as one such identifier for each sub-payload.

The technique of FIG. 4 can further include attempting and failing to successfully transmit an additional sub-payload of the overall payload to the destination computer system. The additional sub-payload may be a sub-payload that is not one of the transmitted sub-payload(s), and the additional sub-payload may come after the transmitted sub-payload(s) in the priority order. The technique of FIG. 4 can further include caching the additional sub-payload in response to the failing to successfully transmit the additional sub-payload. The technique may include receiving an additional request to transmit, and transmitting the additional sub-payload from the cache to the destination computer system in response to the additional request to transmit. Alternatively, the technique may further include discarding the additional sub-payload without successfully sending the additional sub-payload to the destination computer system.

The sub-payload priority order can include a first sub-payload with user input feedback data (such as entered textual data describing feedback regarding the experience) earlier in the priority order than a second sub-payload that includes context data regarding the experience (such as a screen shot, code for a displayed page, or trace log data).

The technique of FIG. 4 may further include in response to the request, identifying a context of the experience (such as a user interface experience), and selecting the set of computer-readable rules from among multiple different available sets of computer-readable rules using results of the identifying of the context of the experience.

The one or more transmitted sub-payloads can include multiple transmitted sub-payloads, which may include a subset of the sub-payloads in the overall payload, or all of the sub-payloads in the overall payload (where all sub-payloads are successfully transmitted).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A source computer system comprising:
   at least one processor; and
   memory comprising instructions stored thereon that when executed by at least one processor cause at least one processor to perform acts comprising:
      receiving a computer-readable request at the source computer system to transmit an overall payload comprising feedback data from the source computer system to a remote destination computer system, with the feedback data providing information about an experience in the source computer system;
      in response to the request, defining via the source computer system, a plurality of sub-payloads in the overall payload, with each of the defined sub-payloads being a computer-usable payload that includes feedback data regarding the experience and that is configured to be used to determine information about the experience in the source computer system without one or more other sub-payloads in the overall payload, with the plurality of sub-payloads comprising a first sub-payload and a second sub-payload, and with the first sub-payload comprising a first type of feedback data and the second sub-payload comprising a second type of feedback data that is different from the first type of feedback data;
      in response to the request, prioritizing via the source computer system, the sub-payloads relative to each other to produce a computer-readable sub-payload priority order of transmitting the sub-payloads from the source computer system to the destination computer system, with the prioritizing using a set of computer-readable rules that dictate different priorities for different sets of data in the sub-payloads based on one or more factors comprising one or both of sub-payload size and sub-payload importance;
      transmitting one or more of the sub-payloads from the source computer system to the destination computer system separately from each other in the sub-payload priority order, wherein the one or more transmitted sub-payloads comprise multiple sub-payloads that are each different sizes, and wherein the rules favor sending smaller sub-payloads earlier than larger sub-payloads;
      generating data associating the one or more transmitted sub-payloads with the overall payload; and
      transmitting to the destination computer system the data associating the one or more transmitted sub-payloads with the overall payload.

2. The source computer system of claim 1, wherein:
   the generating of the data associating the one or more transmitted sub-payloads with the overall payload comprises producing one or more identifiers, including an identifier for each of the one or more transmitted sub-payloads, with each identifier of the one or more identifiers being configured to associate a corresponding sub-payload with the overall payload; and
   the transmitting of the data associating the one or more transmitted sub-payloads with the overall payload comprises transmitting the one or more identifiers to the destination computer system.

3. The source computer system of claim 2, wherein the acts further comprise including each identifier of the one or more identifiers in its corresponding sub-payload, and wherein the transmitting of the one or more identifiers comprises transmitting each identifier of the one or more identifiers as part of its corresponding sub-payload.

4. The source computer system of claim 3, wherein the one or more identifiers comprise multiple identifiers that are the same as each other.

5. The source computer system of claim 1, wherein the acts further comprise attempting and failing to successfully transmit an additional sub-payload of the overall payload to the destination computer system, with the additional sub-payload not being one of the one or more transmitted sub-payloads, and with the additional sub-payload coming after the one or more transmitted sub-payloads in the sub-payload priority order.

6. The source computer system of claim 5, wherein the acts further comprise caching the additional sub-payload in response to the failing to successfully transmit the additional sub-payload.

7. The source computer system of claim 6, wherein the acts further comprise receiving an additional request to transmit, and transmitting the additional sub-payload from the cache to the destination computer system in response to the additional request to transmit.

8. The source computer system of claim 6, wherein the acts further comprise discarding the additional sub-payload without successfully sending the additional sub-payload to the destination computer system.

9. A computer-implemented method, comprising:
   receiving a computer-readable request in response to user input at a source computer device to transmit an overall payload comprising feedback data from the source computer device to a destination computer system, with the feedback data providing information about a user interface experience in the source computer device, and with the feedback data comprising user input feedback data regarding the user interface experience;
   in response to the request, defining via the source computer device, a plurality of sub-payloads in the overall payload, with each of the defined sub-payloads being a computer-usable payload that includes feedback data regarding the experience that is configured to be used to determine information about the user interface experience without one or more other sub-payloads in the overall payload, with the plurality of sub-payloads comprising a first sub-payload and a second sub-payload, and with the first sub-payload comprising a first type of feedback data and the second sub-payload comprising a second type of feedback data that is different from the first type of feedback data;
   in response to the request, prioritizing via the source computer device, the sub-payloads relative to each other to produce a computer-readable sub-payload priority order of transmitting the sub-payloads from the source computer device to the destination computer system, with the prioritizing using a set of computer-readable rules that dictate different priorities for different sets of data in the sub-payloads based on one or more factors comprising one or both of sub-payload size and sub-payload importance;

transmitting one or more of the sub-payloads from the source computer device to the destination computer system separately from each other in the sub-payload priority order, wherein the one or more transmitted sub-payloads comprise multiple sub-payloads that are each different sizes, and wherein the rules favor sending smaller sub-payloads earlier than larger sub-payloads;

generating data associating the one or more transmitted sub-payloads with the overall payload; and transmitting to the destination computer system the data associating the one or more transmitted sub-payloads with the overall payload.

10. The method of claim 9, wherein the sub-payload priority order includes a first sub-payload with the user input feedback data earlier in the priority order than a second payload that includes context data regarding the user interface experience.

11. The method of claim 9, further comprising, in response to the request, identifying a context of the user interface experience, and selecting the set of computer-readable rules from among multiple different available sets of computer-readable rules using results of the identifying of the context of the user interface experience.

12. The method of claim 9, wherein the one or more transmitted sub-payloads comprise multiple sub-payloads.

13. The method of claim 9, wherein:
the generating of the data associating the one or more transmitted sub-payloads with the overall payload comprises producing one or more identifiers, including an identifier for each of the one or more transmitted sub-payloads, with each identifier of the one or more identifiers being configured to associate a corresponding sub-payload with the overall payload; and
the transmitting of the data associating the one or more transmitted sub-payloads with the overall payload comprises transmitting the one or more identifiers to the destination computer system.

14. The method of claim 9, wherein the method comprises attempting and failing to successfully transmit an additional sub-payload of the overall payload to the destination computer system, with the additional sub-payload not being one of the one or more transmitted sub-payloads, and with the additional sub-payload coming after the one or more transmitted sub-payloads in the sub-payload priority order.

15. The method of claim 14, further comprising caching the additional sub-payload in response to the failing to successfully transmit the additional sub-payload.

16. The method of claim 15, further comprising receiving an additional request to transmit, and transmitting the additional sub-payload from the cache to the destination computer system in response to the additional request to transmit.

17. The method of claim 15, further comprising discarding the additional sub-payload without successfully sending the additional sub-payload to the destination computer system.

18. One or more computer-readable memory having computer-executable instructions embodied thereon that, when executed by at least one processor, cause at least one processor to perform acts comprising:
receiving a computer-readable request at a source computer system to transmit an overall payload comprising feedback data from the source computer system to a destination computer system, with the feedback data providing information about an experience in the source computer system;
in response to the request, defining via the source computer system, a plurality of sub-payloads in the overall payload, with each of the defined sub-payloads being a computer-usable payload that includes feedback data regarding the experience that is configured to be used to determine information about the experience in the source computer system without one or more other sub-payloads in the overall payload, with the plurality of sub-payloads comprising a first sub-payload and a second sub-payload, and with the first sub-payload comprising a first type of feedback data and the second sub-payload comprising a second type of feedback data that is different from the first type of feedback data;
in response to the request, prioritizing via the source computer system, the sub-payloads relative to each other to produce a computer-readable sub-payload priority order of transmitting the sub-payloads from the source computer system to the destination computer system, with the prioritizing using a set of computer-readable rules that dictate different priorities for different sets of data in the sub-payloads based on one or more factors comprising one or both of sub-payload size and sub-payload importance;
transmitting one or more of the sub-payloads from the source computer system to the destination computer system separately from each other in the sub-payload priority order, wherein the one or more transmitted sub-payloads comprise multiple sub-payloads that are each different sizes, and wherein the rules favor sending smaller sub-payloads earlier than larger sub-payloads; and
transmitting to the destination computer system an identifier for each of the one or more transmitted sub-payloads, with each of the one or more identifiers associating a corresponding one of the one or more transmitted sub-payloads with the overall payload.

19. The one or more computer-readable memory of claim 18, wherein the acts further comprise attempting and failing to successfully transmit an additional sub-payload of the overall payload to the destination computer system, with the additional sub-payload not being one of the one or more transmitted sub-payloads, and with the additional sub-payload coming after the one or more transmitted sub-payloads in the sub-payload priority order.

20. The one or more computer-readable memory of claim 19, wherein the acts further comprise caching the additional sub-payload in response to the failing to successfully transmit the additional sub-payload.

* * * * *